United States Patent [19]

Iseman

[11] 3,928,181
[45] Dec. 23, 1975

[54] SEED SEPARATOR

[75] Inventor: John E. Iseman, Hartsville, S.C.

[73] Assignee: Coker's Pedigreed Seed Company, Hartsville, S.C.

[22] Filed: Dec. 3, 1973

[21] Appl. No.: 412,304

[52] U.S. Cl. ............... 209/11; 209/172.5; 209/173; 209/464
[51] Int. Cl. ............................................ B03b 5/30
[58] Field of Search ........ 209/2, 10, 11, 172, 172.5, 209/173, 464; 99/233.6, 570; 241/38, 46 R

[56] References Cited
UNITED STATES PATENTS

| | | | |
|---|---|---|---|
| 1,036,475 | 8/1912 | Evans | 209/173 |
| 1,835,634 | 12/1931 | Chapman | 209/173 |
| 1,879,439 | 9/1932 | Olney | 209/173 |
| 2,240,503 | 5/1941 | Kettenbach | 209/173 |
| 2,533,655 | 12/1950 | Wilmot | 209/173 |
| 2,832,470 | 4/1958 | Rietema | 209/172.5 |
| 3,249,219 | 5/1966 | Sanfilippo et al. | 209/2 |

Primary Examiner—Tim R. Miles
Assistant Examiner—Gregory N. Clements
Attorney, Agent, or Firm—C. Gordon McBride

[57] ABSTRACT

Apparatus wherein cotton seed and cocklebur raw material is fed into a trough containing a liquid which causes the cotton seed to sink to the bottom of the trough where a screw moves the seed into a receptacle from which it is conveyed to a dryer. The cockleburs float from the first trough into a fourth trough in which a screw moves them to an outlet. The system is so designed that the liquid may be recirculated for continual use.

2 Claims, 4 Drawing Figures

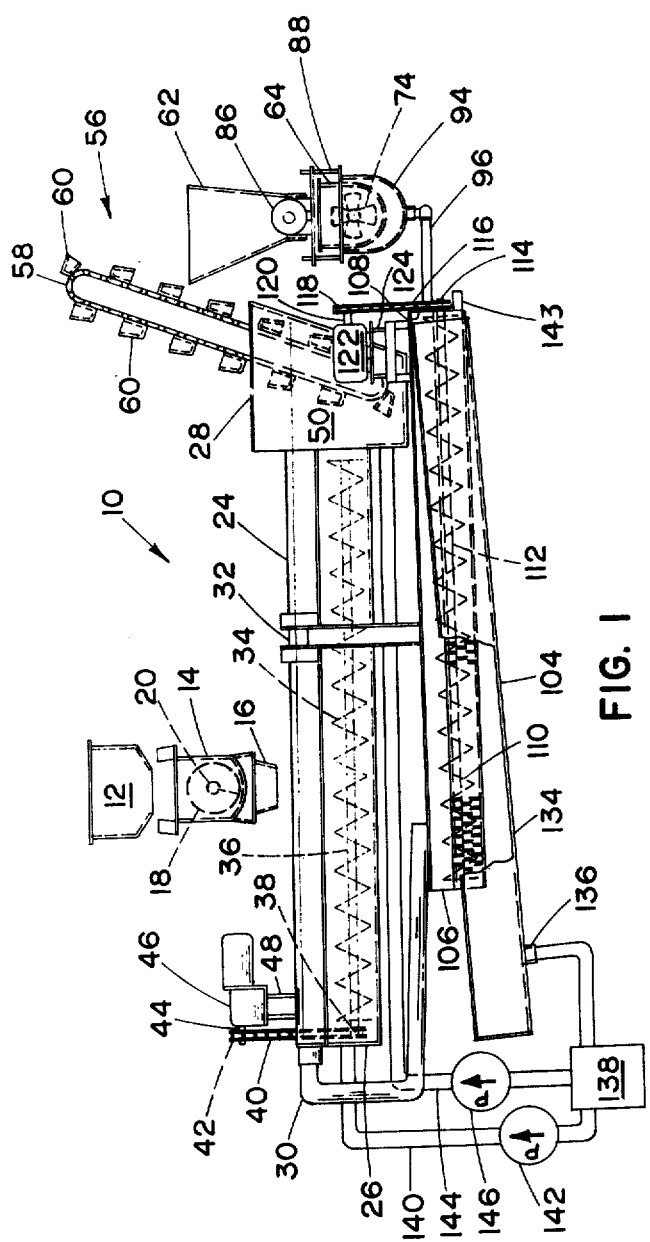
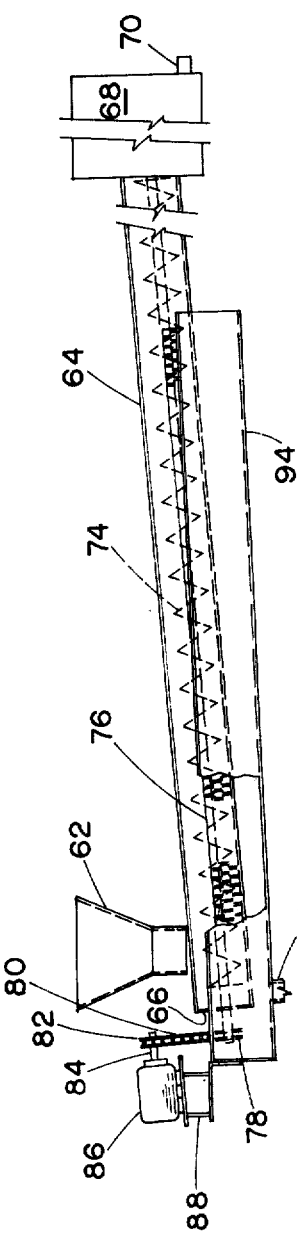

SEED SEPARATOR

BACKGROUND

This invention relates generally to separation and removal of cockleburs from cotton seed and more particularly to an apparatus utilizing a difference in specific gravity of the two for separation thereof.

The problem of separation of cockleburs from cotton planting seed has existed for many years in cotton planting seed production facilities, particularly when machine delinted, or reginned, seed is marketed. Cockleburs are a noxious weed which is prevalent throughout many areas of the cotton belt and in many states cotton planting seed containing such are not legally saleable. The cocklebur is about the same size as a cotton seed and is covered with tiny spines which adhere to the fuzzy lint coat of the cotton seed. This makes it virtually impossible to separate cockleburs from machine delinted cotton seed as they cannot be removed by air blast or the conventional shaker-type seed cleaners. Thus it has been an object of cotton planting seed production to eliminate the cockleburs and provide high quality planting seed, meeting the standards of seed purity as required by the various regulatory agencies. All previously used methods for such separation have been highly inadequate due to the difficulty in physical separation of the fuzz covered cotton seed and spine covered cocklebur seed. In the instant process the seed is readily wetted by the low surface tension liquid, made further effective by wetting agents, and the two types of seed separate quite readily due to differences in density and specific gravity.

It has also been known to separate various materials from one another by relying upon the difference in specific gravity of the two materials with the lighter material being removed or floated from the top and the heavier material being removed from the lower portion of the liquid receptacle. However, the apparatus for accomplishing such devices has been incapable of handling large quantities of materials and it has not been known that certain chemicals could be utilized for separation of cockleburs from cotton seed. Any apparatus which has been utilized previously for separation of cockleburs and cotton seed has been expensive and complicated of operation and deleterious to the future germination of the planting seed.

SUMMARY

The instant invention overcomes the disadvantages of the prior art by providing an inlet for the raw material which feeds into a trough having a liquid chemical and a moving screw such that the cockleburs are floated from the top of the liquid into another trough with a screw conveyor for removing the cockleburs. A receptacle receives the cotton seed from which a conveyor moves it into a second trough that has a screw conveyor for moving the seed to a dryer while permitting the liquid to drain therefrom. The chemicals from the second trough are fed back to the trough from which the cockleburs are removed and subsequently to a storage container from which the make-up liquid flowing into the first trough is obtained. Thus, the liquid is in a closed system and capable of reuse while the cotton seed is separated and moved to a dryer and the cockleburs are removed for disposal.

DESCRIPTION OF THE DRAWINGS

Referring to the drawings wherein like numerals designate the same or like parts and wherein:

FIG. 1 is a diagrammatic front elevational view of the apparatus of the instant invention;

FIG. 2 is a right side elevational view of the invention shown in FIG. 1;

DETAILED DESCRIPTION OF PREFERRED EMBODIMENT

Figure 3:
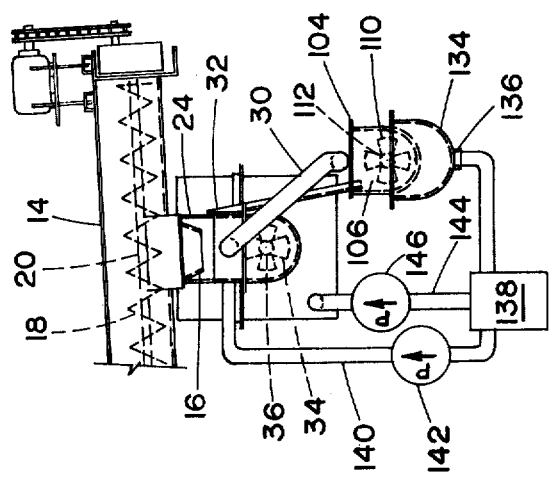
FIG. 3 is a diagrammatic view of the left side of the apparatus shown in FIG. 1.
Figure 4:
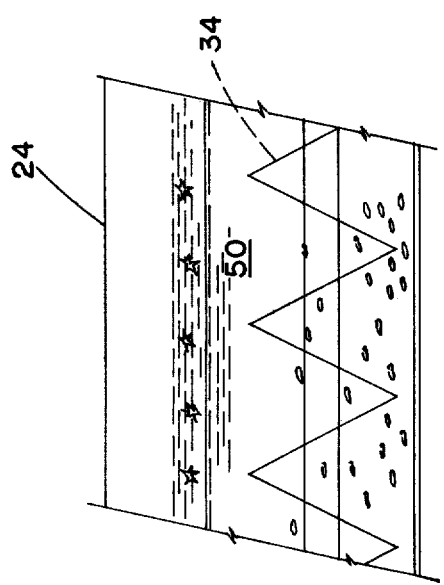
FIG. 4 is an enlarged diagrammatic view of the separation of the cockleburs and cotton seed in the instant invention.

Referring to FIG. 1, separator apparatus 10 is shown to include a source of raw material of cotton seed which includes cockleburs and other undesirable materials. The seed is delivered to trough 14 having an outlet 16 over separation trough 24. A helix screw 18 moves in trough 14 to cause the cotton seed material to move into outlet 16. Helix screw 18 has shaft 20 which is appropriately mounted on bearings and driven by a motor, not shown.

Separation trough 24 extends substantially perpendicular to the delivery trough 14 and has a closed end 26. At the other end of first trough 24 is located receptacle 28 in which the cotton seed is accumulated.

Outlet conduit 30 leads from separation trough 24, as does outlet channel 32, to a cocklebur receiving trough 104. Helix screw 34 which may have a central cut-flight section and is mounted on shaft 36 in separation trough 24 with a bearing, not shown, at the end adjacent receptacle 28. The end of shaft 36 adjacent closed end 26 of trough 24 has a gear 38 on which chain 40 is mounted. The chain 40 extends over drive gear 42 mounted on motor shaft 44 which is driven by motor 46. Motor 46 is supported by motor mount 48.

Separation trough 24 is liquid tight and contains a liquid, as will be described more fully hereinafter, in sufficient quantities to permit the cockleburs to float to outlet conduit 30 and outlet channel 32.

Trough 24 connects with receptacle 28 which is of greater size and deeper than trough 24 to receive the cotton seed which are moved thereinto by screw 34. A conventionally driven conveyor 56 is mounted in an upright position and includes chain 58 having perforated cups 60 mounted thereon. As cups 60 pass through the cotton seed accumulated in the bottom of receptacle 28 they pick up the seed which is delivered to hopper 62. Hopper 62 deposits the cotton seed into a second or dryer trough 64 which has a closed end 66. It is noted that trough 64 is perforated to permit the liquid retained by the cotton seed and delivered by the perforated cups 60 to filter into a third or liquid receiving and return trough 94 having outlet 96 at the lower end thereof.

Trough 64 leads to dryer 68 which has outlet 70 for removal of the separated cotton seed or for association with a conveyor for transporting the cotton seed to packaging facilities, not shown.

Trough 64 has cut-flight screw 74 mounted therein on shaft 76. Shaft 76 is mounted on a bearing, now shown, at the end adjacent dryer 68. The other end of shaft 76 has gear 78 which is connected by chain 80 to drive gear 82 mounted on motor shaft 84. Motor 86 is supported on motor mount 88 and drives the motor shaft for subsequent rotation of the cut-flight screw for movement of the cotton seed in trough 64 to dryer 68.

Perforated or fourth trough 104 extends substantially parallel to separator trough 24 and is located therebelow. Trough 104 is perforated to permit liquids to be drained and provide a wet mass of cockleburs. Trough 104 is closed at end 106 adjacent burr receiving conduit 30 and channel 32 from trough 24 also leads into trough 104. A helix screw 110 is mounted on shaft 112 in trough 104. A bearing, not shown, adjacent closed end 106 supports that end of shaft 112. Shaft 112 has gear 114 mounted on the end thereof adjacent the chemical receiving end 108. Chain 116 connects gear 114 to drive gear 118. Gear 118 is attached to motor shaft 120 which is powered by motor 122. Motor 122 is supported on motor mount 124.

Fifth trough 134 surrounds trough 104 and is liquid tight to receive the liquid drained from trough 104 similar to the construction and relationship of troughs 94 and 64. Trough 134 is sloped toward outlet 136 such that the chemical will move to the outlet. Outlet 136 leads to chemical storage container 138 which in turn is connected by conduit 140 to separator trough 24. Depending upon the location of chemical storage container 138, pump 142 may be necessary for movement of liquid from container 138 to trough 24. Troughs 104 and 134 have common outlet 143 from which the cockleburs are removed for disposal. Conduit 144 extends from chemical storage 138 to receptacle 28 and has pump 146 mounted therein for pumping liquid into receptacle 28 for a purpose to be more fully described hereinafter.

It has been found that the chemical solution which is effective as a penetrant to the cotton seed is Triton GR5 manufactured by Rohm and Haas. The liquid utilized in the penetrant type operation of the above-described apparatus requires one quart of the penetrant to approximately 60 gallons of water. It has been noted to be beneficial to utilize one-half ounce per 60 gallons of water of a defoaming agent such as Dow Corning Corporation's C Emulsion.

Although the penetrant operation of the apparatus has been described, it is also possible to utilize the specific gravity of the respective materials, cockleburs and cotton seed, for separation thereof. A solution comprised of 25% alcohol and 75% water will provide the necessary liquid which can be circulated in the system and effect separation of the cotton seed from the cockleburs.

MODE OF OPERATION

The seed and burr raw material is fed by screw 18 in trough 14 through outlet 16 which deposits it in trough 24. The cockleburs tend to float and are removed through conduit 30 and channel 32. Screw 34 moves the cotton seed that accumulates on the bottom of trough 24 into receptacle 50. Perforated cups 60 pick the cotton seed up and deliver it to hopper 62 from which the seed is delivered to trough 64. Cut-flight screw 74 moves the seed deposited in trough 64 to dryer 68 where it is dried under proper moisture conditions and removed through outlet 70.

The cockleburs are received in trough 104 which is perforated to permit the liquid that is removed with the burrs to drain into trough 134. Screw 110 is mounted in trough 104 such that the cockleburs are removed to the right, as seen in FIG. 1, and deposited through outlet 144.

Trough 64 is perforated to permit any liquid which is deposited therein by the cups 60 or which is retained by the cotton seed to be drained into trough 94 from which the chemical is conveyed by conduit 96 into trough 134. Thus it is seen that trough 134 receives the liquid which is removed from the burrs in trough 104 and the cotton seed in trough 64 and is so positioned that the liquid can be drained through outlet 136 and recirculated.

It has been found that enhanced operation of the instant invention can be accomplished by pumping liquid into receptacle 28. This additional operation causes a counterflow of the liquid in separation trough 24 such that the liquid in the bottom of trough 24 moves toward receptacle 28 and the top portion of the liquid flows toward conduit 30. Therefore, the counterflow action assists in moving the seed along the bottom of trough 24 into receptacle 28 and moving the cockleburs along the top of screw 34 toward removal conduit 30.

The instant invention provides a simple apparatus and method which permit the efficient separation of cotton seed from cockleburs and other undesirable materials. The system also provides a degree of separation of immature seed from fully mature seed, thus enhancing the germination percentage. It does not require highly skilled labor for operation. The chemicals ulitized are of low cost and generally easily handled. The apparatus reduces labor costs and is capable of operating substantially automatically by having the motor controls interconnected such that all motors operate simultaneously.

What is claimed is:

1. Cotton seed separator apparatus comprising a delivery trough having a helix screw for moving raw material having cotton seed and undesirable material therein; a separator trough having a helix screw therein for moving the separated seed; conduit means for removing the undesirable material from said separator trough; a receptacle for receiving the separated cotton seed; conveyor means having perforated cups for moving the cotton seed; hopper means for receiving the cotton seed from the perforated cups; trough means having a screw therein for conveying the separated cotton seed to a dryer; said second trough being perforated to permit the draining of liquid therefrom; a third trough associated with said second trough for receiving any liquid that may be drained therefrom; said third trough connected by a conduit to a fifth trough; a fourth trough having a screw mounted therein for conveying undesirable material separated from the cotton seed; said fourth trough being perforated to permit liquid to drain into said fifth trough; said fifth trough mounted below said fourth trough to receive liquids and permit the circulation thereof; liquid storage means connected with said first trough and said fifth trough to permit liquid to be recirculated from said first, second, third, fourth and fifth troughs.

2. Cotton seed separator apparatus comprising a delivery trough having means for moving raw material having cotton seed and undesirable material therein to a separator trough; a separator trough connected with said delivery trough and having a liquid therein and means for moving the separated seed; conduit means for removing the undesirable material from said separator trough; a receptacle for receiving the separated cotton seed; conveyor means having perforated cups for removing the cotton seed from said receptacle;

hopper means for receiving the cotton seed from said conveyor means; a conveying trough having means therein for conveying the separated cotton seed to a dryer; said conveying trough being perforated to permit the draining of liquid therefrom; a third trough associated with said conveying trough for receiving any liquid that may be drained therefrom; said third trough connected by a conduit to drainage trough; a removing trough having a means for removing undesirable material separated from the cotton seed; said removing trough being perforated to permit liquid to drain into said drainage trough; said drainage trough mounted below said removing trough to receive liquids; liquid storage means connected with said separator trough and said drainage trough for recirculation of the liquid from said drainage trough to establish a counterflow of liquid with relationship to said means for moving the separated cotton seed.

* * * * *